US006569342B1

(12) United States Patent
Willuweit et al.

(10) Patent No.: US 6,569,342 B1
(45) Date of Patent: May 27, 2003

(54) PROCESS FOR TREATING WATERS, SOILS, SEDIMENTS AND/OR SILTS

(75) Inventors: Thomas Willuweit, Schleizer Strasse 105, D-95028, Hof (DE); Stefan Nowicki, Essen (DE); Kai-Uwe Ulrich, Zschopau (DE); Gerald Jakobson, Durbach (DE)

(73) Assignees: Thomas Willuweit (DE); Peter Söll (DE)

( * ) Notice: Subject to any disclaimer, the term of this patent is extended or adjusted under 35 U.S.C. 154(b) by 0 days.

(21) Appl. No.: 09/716,124

(22) Filed: Nov. 14, 2000

Related U.S. Application Data

(63) Continuation-in-part of application No. PCT/EP99/03253, filed on May 12, 1999.

(30) Foreign Application Priority Data

May 14, 1998 (DE) .......................................... 198 21 609
Nov. 6, 1998 (DE) .......................................... 198 51 345

(51) Int. Cl.$^7$ ................................................. C02F 1/52
(52) U.S. Cl. ............................... 210/714; 71/11; 71/12; 71/42; 71/901; 210/717; 210/721; 210/723; 210/726; 210/738; 210/747; 210/759; 210/906; 210/912; 405/128.1; 405/128.75
(58) Field of Search ............................... 210/667, 683, 210/688, 710, 721, 668, 714, 747, 726, 738, 759, 752, 906, 912, 717, 723; 71/11, 12, 42, 901; 405/128.5, 128.75

(56) References Cited

U.S. PATENT DOCUMENTS

| 4,917,802 | A | * | 4/1990 | Fukaya et al. | 210/500.1 |
| 5,075,007 | A | * | 12/1991 | Morper et al. | 210/604 |
| 5,124,044 | A | * | 6/1992 | Cassidy et al. | 210/169 |
| 5,132,021 | A | * | 7/1992 | Alexander | 210/170 |
| 5,207,925 | A | * | 5/1993 | Steiner et al. | 210/746 |
| 5,208,006 | A | * | 5/1993 | Kuznicki et al. | 208/119 |
| 5,264,018 | A | * | 11/1993 | Koenigsberg et al. | 435/262.5 |
| 5,741,427 | A | * | 4/1998 | Watts et al. | 210/747 |
| 5,869,415 | A | * | 2/1999 | Ortiz et al. | 502/80 |
| 6,274,051 | B1 | * | 8/2001 | Cronce | 210/753 |
| 6,319,328 | B1 | * | 11/2001 | Greenberg et al. | 134/10 |
| 6,350,383 | B1 | * | 2/2002 | Douglas | 210/679 |
| 6,419,836 | B1 | * | 7/2002 | Willuweit | 210/749 |

FOREIGN PATENT DOCUMENTS

WO    WO 95/18070    * 7/1995

\* cited by examiner

*Primary Examiner*—Peter A. Hruskoci
(74) *Attorney, Agent, or Firm*—R W Becker & Associates; R W Becker

(57) ABSTRACT

A method is providing for treating waters, such as standing and flowing waters and waste waters, soils, sediments and/or silts. At least one alkaline earth metal peroxide is brought into contact with such waters or the like, especially to effect immobilization of phosphates and heavy metals except manganese and iron therein.

15 Claims, 1 Drawing Sheet

PROCESS FOR TREATING WATERS, SOILS, SEDIMENTS AND/OR SILTS

RELATED APPLICATIONS

This is a continuation-in-part application of European Patent Application Serial Number PCT/EP99/03253 filed May 12, 1999.

BACKGROUND OF THE INVENTION

The present invention relates to a process for treating waters, such as standing and flowing waters and waste waters, soils, sediments and/or silts.

Water bodies, soils, sediments and/or silts always comprise a certain proportion of organic matter. Especially in the case of waters, that is to say both water bodies and waste waters, the organic compound content, inter alia, determines the water quality. The organic matter firstly increases the COD and BOD values and secondly leads in the course of time to the formation of detritus, that is to say to silting and, in the extreme case, to accretion.

High COD and BOD values mean that material is present which has a high oxygen demand and leads to oxygen deficit for the microorganisms and other forms of life, and finally to their dying off. The degraded material is present in the water as additional organic matter, for example as suspended particles, which is accompanied by a further decrease in water quality.

To prevent accretion in water bodies, in particular ponds, the silts formed must be mechanically removed at regular intervals. However, this mechanical removal of silts requires an adequate particle size. Suspended particles generally cannot be removed.

Also, the fouling of waters, soils, sediments and/or silts impairs the activity of the microorganisms living therein, which in turn leads to an interference in the natural equilibrium.

A further problem, especially in the case of inland water bodies, is the phosphate contents, which are responsible for eutrophication of water bodies. The reduction in phosphate concentration in eutrophied water bodies is generally the key to successful remediation, that is to say to improving the water quality and possibilities for use. Therefore, for more than two decades, attempts have been and are being made with varying degrees of success to decrease the phosphate concentration in particular in lakes and sewage treatment plant effluents. Established processes employ iron salts and aluminum salts as precipitants. Recent developments relate to the optimization of biological phosphate elimination and technical control of biogenic calcite precipitation and flushing lacustrine chalk deposits as potential methods of ecotechnological water body remediation.

The known processes for phosphate removal, however, have the disadvantage that the precipitation of phosphate proceeds only incompletely and is also sometimes technically complex. By adding Al compounds or Fe compounds, furthermore, aluminum ions and iron ions are also introduced into the water, which does not always have beneficial consequences on water quality.

From the prior art it is known to treat fouled water with a mixture of $Ca(OH)_2$ and $H_2O_2$. In processes of this type the existing phosphate is precipitated as calcium hydrogen phosphate, whose solubility product is highly dependent on the pH. An equilibrium state forms with the components present in the aqueous environment. In some cases, the hydrogen phosphate even redissolves. Such a process does not permit permanent mineral phosphate binding in the treated systems and does not ensure a balanced oxygen environment which can be tolerated by water organisms and sediment dwellers.

The object underlying the present invention is thus to provide a process for treating waters, soils, sediments and/or silts which enables organic matter which is present as silt or suspended matter to be degraded and thus to reduce the content of oxygen-consuming substances and simultaneously to improve the nitrification and enzyme activity of the microorganisms present.

A further object was to provide a process which enables phosphate to be removed from waters, soils, sediments and/or silts such that the phosphate content is decreased below the ecologically required maximum content and the phosphate is bound in such a manner that it is not re-released by the water by dissolution or leaching. A further object is to reduce the content of other pollutants present in such systems simultaneously with the phosphate elimination.

SUMMARY OF THE INVENTION

The present invention relates to a process for treating waters, such as standing and flowing waters and waste waters, soils, sediments and/or silts, characterized in that the waters or sediments are treated with alkaline earth metal peroxides.

Surprisingly, it has been found that by using alkaline earth metal peroxides for treating waters, soils, sediments and/or silts, the content of organic, matter which is present as silt or suspended matter, can be greatly reduced and the microbial degradation performance can also be promoted. It is assumed that when alkaline earth metal peroxides are added to waters, soils, sediments and/or silts a mineralization of the organic matter takes place, that is to say conversion of organic matter to inorganic matter. At the same time other harmful substances can be immobilized, for example if these are precipitated together with other solids. Experiments have found that odor and flavor substances are also degraded and nitrification is promoted.

In the treatment of phosphate-containing waters, soils, sediments and/or silts with alkaline earth metal peroxides, phosphate can be eliminated so excellently that the phosphate concentration is far below 30 µg of P/L after treatment. The currently available experimental results have found a decrease in orthophosphate concentration of 3.26 and 0.33 mg of P/L to 6 and 3 µg of P/L, respectively, within a very short time.

It has further been found that the pH of the system treated according to the invention increases in the alkaline region and elemental oxygen is released. This action must generally be assessed as positive in aquatic systems, since it counteracts the oxygen deficit due to oxygen-consuming degradation processes.

The advantage over biological phosphate elimination is the reliable elimination of the phosphate. The advantage over other chemical phosphate elimination processes is the high efficacy, that is to say the great reduction in orthophosphate concentration with relatively low use of alkaline earth metal peroxide used according to the invention. The inventive process can prevent development of algal mass and thus avoid the associated water body problems. The alkaline earth metal peroxide, used in equimolar amounts, can remove phosphate from the waters. In addition, the precipitation product is suitable as mineral fertilizer raw material and thus capable of being recycled.

After use of the inventive process, it is not necessary to remove any precipitated material from the waters or soils, sediments and/or silts, it can remain in the water or in the sediment. The precipitated material essentially consists of mineralized substances to which substances impairing water quality are also bound by absorption or else can be incorporated into the solid. The present process is therefore to be used advantageously, in particular in what are termed passive water treatment systems.

Alkaline earth metal peroxides have been previously used, inter alia, as additives in bread, in toothpastes, in the cosmetics industry and as oxygen donors in composting. Alkaline earth metal peroxides are obtained from aqueous alkaline earth metal hydroxide solutions and $H_2O_2$ in a specific process. It is known that simple mixing of the hydroxide solutions and $H_2O_2$ does not lead to alkaline earth metal peroxides, but only to the decomposition of the $H_2O_2$ used.

When this process is used for waste water clean-up, there is additionally the advantage that, depending on the properties of the waste water, this may be cleaned up in a short time in a very simple single-stage process. This involves comparatively less outlay on equipment and is thus less costly.

It has been found that the inventive use of alkaline earth metal peroxides for treating water body sediments, silts and soils removes the phosphates as sparingly soluble compounds and permanently binds them, so that remobilization or leaching of the phosphates on contact with water is effectively suppressed.

The observations to date imply that, without verifying this, phosphate is precipitated and immobilized in mineral form as hydroxylapatite by the process.

It has further been found that the inventive treatment of the waters or soils, sediments and/or silts, due to the precipitation of the phosphates, also reduces the contents of other pollutants which impair water quality, such as heavy metal compounds and organic compounds.

It is assumed that synergies occur which result from the oxidative action of the peroxides used according to the invention, the increase in pH and the associated formation of sparingly soluble heavy metal species.

For the purposes of the present invention, waters is taken to mean all waters, for example waters in ponds, lakes, rivers, seawater and freshwater aquaria, centers for breeding fish and other marine animals, water from sewage treatment plants and other water treatment plants etc. and any waste waters including industrial waste waters, the resultant waters also being able to comprise soils, sediments and/or silts and sink and float matter. For the purposes of the present invention sediments is taken to mean solids present in waters, for example in ponds, lakes and rivers. The silts can originate, for example, from sewage treatment plants, waste water filters etc.

Suitable alkaline earth metal peroxides are, for example, the peroxides of magnesium, calcium, barium, strontium and their mixtures, with calcium and magnesium or their mixtures preferably being used. Particular preference is given to calcium peroxides, with calcium being able to be replaced by magnesium peroxide, strontium peroxide or barium peroxide, in amounts of 0.02% by weight to 50% by weight, preferably up to 30% by weight, based on $CaO_2$. In commercial products the alkaline earth metal peroxide is present as a mixture with the corresponding carbonate and hydroxide.

Particularly good results have been obtained when the alkaline earth metal peroxides are used in a mixture with alkali metal carbonate-peroxide hydrates. A microbicidal action of alkali metal carbonate-peroxide hydrates is known when used in water.

The alkali metal carbonate-peroxide hydrates are adducts of alkali metal carbonates and $H_2O_2$, $Me_2CO_3.xH_2O_2$, for example $2Me_2CO_3.3H_2O_2$, and preferably $2Na_2CO_3.3H_2O_2$. They are also termed alkali metal percarbonates and are commercially available. From economic and ecological aspects, sodium carbonate-peroxide hydrate has proved to be particularly suitable.

The alkaline earth metal peroxides and alkali metal carbonate-peroxide hydrates are preferably used in ratios of 1:1 to 1:0.03.

The precipitation of phosphate can be increased if seed crystals of apatite or moderately water-soluble phosphate compounds are added to the system to be treated.

To carry out the inventive process, the substances used, that is to say alkaline earth metal peroxides and if appropriate alkali metal carbonate-peroxide hydrates and other optional constituents, are added in an amount from 30 to 300 g/m² of water. In the treatment of sediment, silt or soil, because of the usually greater amount of oxidizable matter, the addition of the substances used according to the invention can be several times the amount to be added to waters.

Furthermore, using the novel process it is possible to decrease heavy metal contents and the contents of interfering anions, for example $PO_4^{3-}$, $NO_2^-$, $SO_3^{2-}$, $S^{2-}$. When used to treat industrial waste waters, in some cases even the currently applicable official limit values (ordinance on indirect introduction) can be achieved, which makes direct introduction of the waste waters into the receiving water body possible.

The inventively used peroxides and other possibly used components can be added to the systems to be treated either as individual substances or in a mixture with other substances as solids, aqueous solutions or suspensions. Solids of this type which can be used are especially silicates, such as sheet silicates or framework silicates, preferably selected from the group consisting of zeolites and bentonites. For practical reasons it is particularly expedient to compact the materials present in solid form and use them for example as granules, pellets or tablets.

In the elimination of phosphate from waters it has proved to be advantageous to pass the waters through an apparatus which comprises the inventive components, possibly applied to support materials. Passing the waters over a fixed bed which comprises the inventively used components is also possible, in which case a contact time must be ensured such that the reaction between the phosphate and the peroxide can take place.

Depending on the water quality and sediment quality, such as carbonate content, pH, etc., it can be appropriate to add other compounds which increase the water quality or sediment quality. Examples of such compounds which may be mentioned are $Ca(OH)_2$, $CaO$, $CaCO_3$, $CaCl_2$, $Ca(NO_3)_2$, $CaSO_4$, $Ca_2SiO_4$, $CaF_2$, $CaI_2$, $CaBr_2$, $Ca_3(PO_4)_2$, $Ca_4H(PO_4)_3$, $Ca_2P_2O_7$, $Ca_4P_2O_9$, $CaHPO_4$, $Ca(PO_3)_3$, $Ca(H_2PO_4)_2$ and the apatites of calcium and mixtures of the above. Depending on the properties of the untreated water, it can be necessary to treat the water to increase the pH using alkali metal salts or alkaline earth metal salts, in particular oxides, hydroxides, carbonates or hydrogencarbonates.

In a preferred embodiment, the inventively used compounds will be present in combination with a mixture of $CaCO_3$, $CaCl_2$ and/or $Ca(NO_3)_2$ and possibly magnesium salts, together with $NaHCO_3$ and possibly $KHCO_3$, with $CaCO_3$ and $CaCl_2$ and/or $Ca(NO_3)_2$ and possibly magnesium salts being present in a quantitative ratio of 0.01:1 to 2:1 and $CaCl_2$ and/or $Ca(NO_3)_2$, and possibly magnesium salts, and $NaHCO_3$ and possibly $KHCO_3$ being present in a quantitative ratio of 1:3 to 2:1. Such a mixture and its suitability for treating waters and sediments is described in European patent application 737 169.

The presence of salts, for example of iron and aluminum, and of oxides, hydroxides, hydrogencarbonates, carbonates, sulfates, nitrates, chloride and fluoride can promote the efficacy of the process: especially by dosing the metals iron and aluminum and fluoride, for example in the form of NaF, KF or $MgF_2$, or other ions having a small ionic radius, these compounds being used in an amount such that the water quality is not impaired.

The inventive process can be used to treat soils, water sediments, silts and water/waste water in open and closed water-containing systems, bodies of water such as seawater, brackish water and freshwater, for example in dams, artificial or natural lakes, bathing waters or fishery waters, ornamental ponds and aquaria. In addition in process waters, for example sewage treatment plants, waste water treatment plants, recycling plants, cooling water plants and heat-exchange plants, waste waters of chemical production plants, or in the treatment of water which results from decomposition and condensation processes (for example landfill leachate water or condensate from thermal waste utilization plants) or by leaching processes (for example water which percolates through contaminated soils, water body sediments or silts).

The inventive process can be carried out by direct dosage of the solid components by hand or by technical devices or aids such as metering systems. The material can be metered directly into the water to be treated or by the water to be treated passing through vessels which comprise the material in solid form, for example filter cartridges, fixed-bed or fluidized-bed reactors.

Thus experiments with highly polluted waste waters from plastics recycling operations have found that, after separating off the precipitation products, the quality of the process water had improved so greatly that in some cases introduction of the treated water into the receiving body of water was possible according to the criteria of the ordinance on indirect or direct introduction. In further applications the inventively used components are incorporated into soils, silts or water body sediments by positive mixers, rotary hoes or other mechanical mixers.

The precipitated phosphates may, provided that their pollutant content permits this, be reused as raw materials, for example as fertilizers, composting aids or in earthworks and agriculture.

The inventive use of the alkaline earth metal peroxides, in addition to increasing the enzyme activity of organisms present, also increases their microbiological activity in general, which leads to an accelerated and increased mineralization process, which can be observed via a decrease in the loss on ignition of the mineralized substrate.

BRIEF DESCRIPTION OF THE DRAWINGS

In conjunction with the following examples, experimental results are shown in the drawing, in which.

EXAMPLES

Comparison of the Stability of $CaO_2$ and a Mmixture of $Ca(OH)_2$ and $H_2O_2$ 1. 500 ml of distilled water were placed into a 1 l glass beaker and 5 g of IXPER 75C ($CaO_2$, commercial product from Solvay Interox, Hanover) were added. Immediately after mixing, the first sample was filtered via a black ribbon filter and dried in the drying cabinet overnight at 70° C. In the dried residue, using $KMnO_4$ (0.02 mol/l) the $CaO_2$ and active oxygen contents were determined (0 value) (duplicate determination). The results are shown in the table below:

|  | Amount of $CaO_2$ [% by weight] | Active oxygen content [%] |
| --- | --- | --- |
| Initial value | 74.4 | 16.5 |
| 0 value after | 73.1 | 16.2 |
| 1 week | 72.6 | 16.1 |
| 2 weeks | 71.3 | 15.9 |
| 3 weeks | 69.7 | 15.5 |
| 4 weeks | 69.4 | 15.4 |
| 5 weeks | 69.2 | 15.4 |
| 6 weeks | 67.1 | 14.9 |
| 7 weeks | 66.1 | 14.7 |

2. 5 g of a mixture of 50% by weight of $Ca(OH)_2$ and 50% by weight of $H_2O_2$ were placed into 500 ml of water. Even after 1 day $H_2O_2$ could no longer be detected by analysis.

Effect of $CaO_2$ on Waters and Sediments

Dam sediment including supernatant water was first made oxygen-free by gas-treatment with argon and then IXPER 75C (Experiment 1) and IXPER 60C (Experiment 2) [commercial $CaO_2$ quality grades, obtainable from Solvay Interox, Hanover) were added in an amount of 177 g/m$^3$.

The microbial activity and loss on ignition were determined as an index of the organic content.

Figure 1:
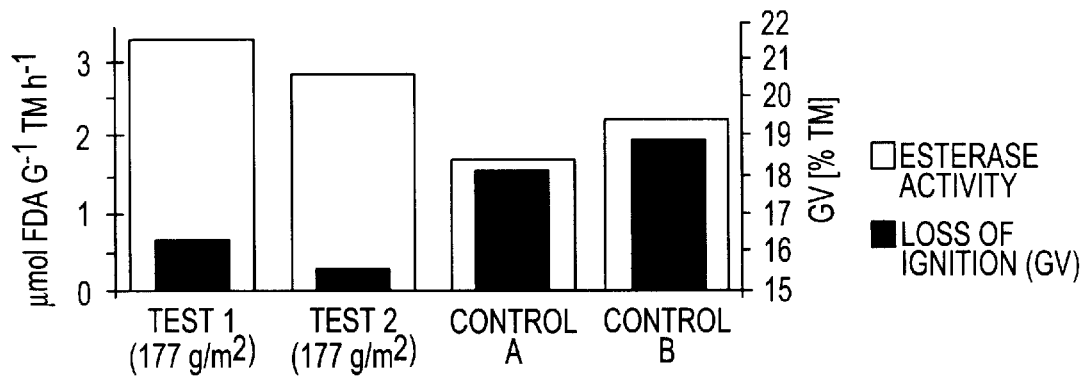
FIG. 1 shows the increase in esterase activity of inventively treated samples.

Experimental results and the results of the control experiments are reproduced in the diagram in FIG. 1. It is clear that the inventively treated samples have a significantly higher esterase activity. The loss on ignition which is an index of the organic matter content in the sample was also significantly lower.

Phosphate Removal

Figure 2:
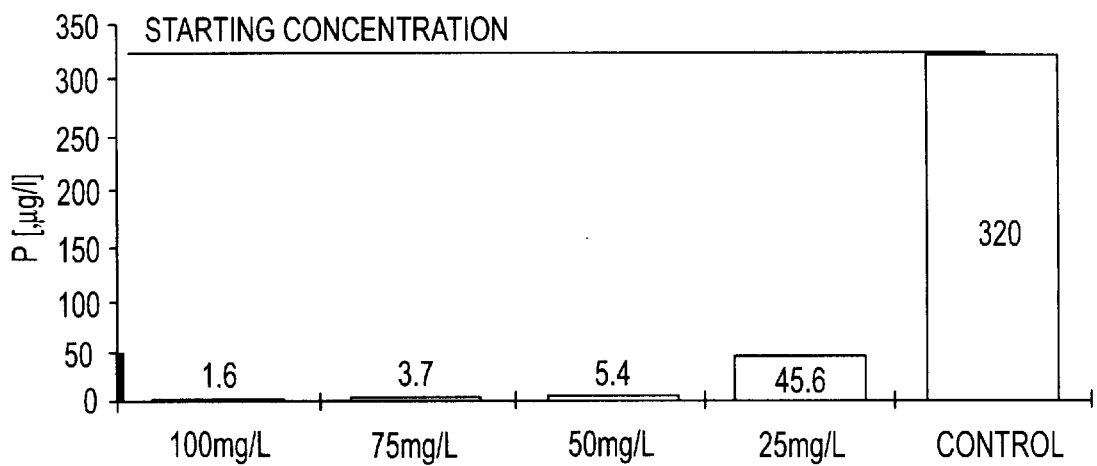
FIG. 2 shows the decrease in phosphate concentration after treatment.

Water having a phosphate content 320 of µg/l was treated with differing amounts of $CaO_2$ (IXPER 75C). The phosphate concentration after treatment was determined in each case. In FIG. 2 the experimental results are reproduced. They show the significant decrease in phosphate content.

The specification incorporates by reference the disclosure of German priority documents 198 21 609.2 of May 14, 1999 and 198 51 345.3 of Nov. 6, 1998 as well as European priority document The present invention is, of course, in no way restricted to the specific disclosure of the specification and drawings, but also encompasses any modifications within the scope of the appended claims.

What we claim is:

1. A method of treating waters selected from the group consisting of standing and flowing waters and waste waters, soils, sediments, and silts, comprising phosphates, organic matter, and heavy metals to immobilize phosphates and heavy metals except manganese and iron therein, said method including the step of:

bringing at least one alkaline earth metal peroxide into contact with said waters to effect immobilization of said phosphates and heavy metals except manganese and iron therein.

2. A method according to claim 1, wherein said at least one alkaline earth metal peroxides is selected from the group consisting of the peroxide of calcium, magnesium, and mixtures thereof.

3. A method according to claim 2, which includes the step of combining said at least one peroxide with alkaline earth metal carbonates.

4. A method according to claim 1, which includes the step of adding alkali metal carbonate-peroxide hydrates to said waters.

5. A method according to claim 4, wherein said alkaline metal carbonate-peroxide hydrates include $2Na_2CO_3 \cdot xH_2O_2$.

6. A method according to claim 1, which includes the step of using said at least one alkaline earth metal peroxide in combination with a mixture of $CaCO_3$, and $CaCl_2$ and/or $Ca(NO_3)_2$, and optionally magnesium salts, together with $NaHCO_3$ and optionally $KHCO_3$, wherein said $CaCO_3$ and $CaCl_2$ and $Ca(NO_3)_2$, and optionally magnesium salts, are present in a quantitative ratio of 0.01:1 to 2:1, and said $CaCl_2$ and $Ca(NO_3)_2$, and optionally magnesium salts, and said $NaHCO_3$, and optionally $KHCO_3$, are present in a quantitative ratio of 1:3 to 2:1.

7. A method according to claim 1, which includes the step of adding silicates to said waters.

8. A method according to claim 7, wherein said silicates are sheet silicates or framework silicates.

9. A method according to claim 7, wherein said silicates are selected from the group consisting of zeolites and bentonites.

10. A method according to claim 1, which includes the step of additionally adding iron ions, aluminum ions, or fluoride ions, to said waters.

11. A method according to claim 1, wherein said at least one alkaline earth metal peroxide is directly added to water that is to be treated, and is added in solid form, as an aqueous suspension or in solution, via at least one of manual addition and metering means.

12. A method according to claim 1, wherein said at least one alkaline earth metal peroxide is in solid form, and wherein water that is to be treated is caused to flow past said at least one alkaline earth metal peroxide.

13. A method according to claim 1, which includes the step of incorporating said at least one alkaline earth metal peroxide into soils, silts or seawater sediments by at least one of a mechanical mixer or rotary hoe.

14. A method according to claim 1, wherein phosphates that are immobilized are used as fertilizers, composting aids, or in earthworks and agriculture.

15. A method according to claim 1, and further comprising disposing the treated waters, after the step of bringing at least one alkaline earth metal peroxide into contact with said waters, in an environment for use of said waters without subjecting said treated waters to a step of removing at least one of phosphates and heavy metals except manganese and iron.

* * * * *